(12) United States Patent
Kaye et al.

(10) Patent No.: US 11,349,161 B2
(45) Date of Patent: May 31, 2022

(54) RECHARGEABLE BATTERY WITH HYDROGEN SCAVENGER

(71) Applicant: Apple Inc., Cupertino, CA (US)

(72) Inventors: Steven Kaye, Oakland, CA (US); Maria N. Luckyanova, Oakland, CA (US); Ghyrn E. Loveness, Mountain View, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/748,586

(22) Filed: Jan. 21, 2020

(65) Prior Publication Data

US 2020/0161719 A1    May 21, 2020

Related U.S. Application Data

(63) Continuation of application No. PCT/US2018/042598, filed on Jul. 18, 2018.

(60) Provisional application No. 62/536,056, filed on Jul. 24, 2017.

(51) Int. Cl.
| | |
|---|---|
| *H01M 10/52* | (2006.01) |
| *H01M 4/62* | (2006.01) |
| *H01M 10/42* | (2006.01) |
| *H01M 50/431* | (2021.01) |

(52) U.S. Cl.
CPC ........... *H01M 10/523* (2013.01); *H01M 4/62* (2013.01); *H01M 10/4235* (2013.01); *H01M 50/431* (2021.01)

(58) Field of Classification Search
None
See application file for complete search history.

(56) References Cited

U.S. PATENT DOCUMENTS

| | | | | |
|---|---|---|---|---|
| 5,162,169 | A | * 11/1992 | Tomantschger | ........ H01M 4/02 429/59 |
| 5,837,158 | A | * 11/1998 | Shepodd | ............. C01B 13/0281 252/181.6 |
| 8,153,410 | B2 | 4/2012 | Jaffe | |
| 8,163,410 | B2 | 4/2012 | Fulop et al. | |
| 2001/0038939 | A1 | 11/2001 | Bailey | |
| 2008/0187824 | A1 | 8/2008 | Tomantscheger | |
| 2009/0068531 | A1 | 3/2009 | Sawa et al. | |
| 2011/0014532 | A1 | 1/2011 | Knuckey et al. | |
| 2012/0189896 | A1 | 7/2012 | Zhou et al. | |
| 2012/0263995 | A1 | 10/2012 | Naito et al. | |
| 2014/0127542 | A1 | 5/2014 | Li et al. | |
| 2014/0154542 | A1 | 6/2014 | Issaev et al. | |
| 2014/0178735 | A1 | 6/2014 | Wang et al. | |
| 2015/0200393 | A1 | 7/2015 | Li et al. | |
| 2015/0236543 | A1 | 8/2015 | Brushett et al. | |
| 2015/0280259 | A1 | 10/2015 | Anderson et al. | |
| 2016/0049679 | A1 | 2/2016 | Stevens et al. | |
| 2016/0248113 | A1 | 8/2016 | He et al. | |
| 2017/0133689 | A1 | 5/2017 | Moore et al. | |
| 2017/0250434 | A1 | 8/2017 | Gennett et al. | |
| 2018/0079721 | A1 | 3/2018 | Armand et al. | |
| 2018/0097248 | A1 | 4/2018 | Nariyama et al. | |
| 2018/0175427 | A1 | 6/2018 | Nariyama | |
| 2018/0175470 | A1 | 6/2018 | Bai et al. | |
| 2018/0294454 | A1 | * 10/2018 | Mackenzie | ............. H01M 6/40 |
| 2018/0316063 | A1 | 11/2018 | Masel et al. | |
| 2019/0036147 | A1 | 1/2019 | Yuan et al. | |
| 2020/0212440 | A1 | 7/2020 | Kolhekar et al. | |
| 2021/0028457 | A1 | 1/2021 | Newhouse et al. | |

FOREIGN PATENT DOCUMENTS

| | | |
|---|---|---|
| EP | 1125336 A1 | 8/2001 |
| EP | 3435473 A1 | 1/2019 |
| JP | 0562683 A | 3/1993 |
| JP | 3522303 B2 | 4/2004 |
| JP | 2009224097 A | 10/2009 |
| JP | 2014029818 A | 2/2014 |
| WO | 2010111087 A1 | 9/2010 |
| WO | 2018213601 A2 | 11/2018 |
| WO | 2019023010 A1 | 1/2019 |
| WO | 2019245461 A1 | 12/2019 |

OTHER PUBLICATIONS

PCT/US2018/042598, "International Preliminary Report on Patentability", dated Feb. 6, 2020, 10 pages.
PCT/US2018/033218, "International Preliminary Report on Patentability", dated Nov. 28, 2019, 9 pages.
PCT/US2018/033218, "International Search Report and Written Opinion", dated Nov. 16, 2018, 13 pages.
PCT/US2018/042598, "International Search Report and Written Opinion", dated Oct. 2, 2018, 14 pages.
U.S. Appl. No. 16/538,660, "Non-Final Office Action", dated Feb. 16, 2021, 12 pages.
PCT/US2020/060348, "International Search Report and Written Opinion", dated Mar. 12, 2021, 9 pages.
PCT/US2020/060350, "International Search Report and Written Opinion", dated Mar. 12, 2021, 12 pages.
Weng, et al., "Three-Electrolyte Electrochemical Energy Storage Systems Using Both Anion-and Cation-Exchange Membranes as Separators", Energy, vol. 167, Jan. 15, 2019, 32 pages.
U.S. Appl. No. 16/245,542, "Non-Final Office Action", dated May 11, 2021, 14 pages.
U.S. Appl. No. 16/538,660, "Final Office Action", dated Oct. 13, 2021, 15 pages.

(Continued)

*Primary Examiner* — Anca Eoff
(74) *Attorney, Agent, or Firm* — Kilpatrick Townsend & Stockton, LLP

(57) ABSTRACT

Energy storage devices, battery cells, and batteries of the present technology may include a first current collector and a second current collector. The batteries may include an anode material coupled with the first current collector. The batteries may include a cathode material coupled with the second current collector. The batteries may also include a separator positioned between the cathode material and the anode material. The batteries may include a hydrogen-scavenger material incorporated within the anode active material or the cathode active material. The hydrogen scavenger material may absorb or react with hydrogen at a temperature above or about 20° C.

10 Claims, 4 Drawing Sheets

(56) References Cited

OTHER PUBLICATIONS

U.S. Appl. No. 16/683,088, "Final Office Action", dated Oct. 12, 2021, 12 pages.
U.S. Appl. No. 16/683,088, "Non-Final Office Action", dated Sep. 2, 2021, 10 pages.
U.S. Appl. No. 16/683,091, "Non-Final Office Action", dated Aug. 18, 2021, 22 pages.
U.S. Appl. No. 16/855,170, "Non-Final Office Action", dated Jul. 27, 2021, 13 pages.
U.S. Appl. No. 16/855,170, "Notice of Allowance", dated Sep. 24, 2021, 9 pages.
Boeva, et al., "Soluble and Highly Ionically Conducting Interpolyelectrolyte Complexes Prepared via Chemical Template Polymerization of Aniline in the Presence of Perfluorinated Polysulfonic Acid", The Royal Society of Chemistry, vol. 4, No. 100, Oct. 2014, pp. 56677-56681.
Thuc, et al., "Study on Synthesis and Characterization of Anion Exchange Membrane Based on Poly (Vinyl Alcohol) Modified by Free-Radical Polymerization", International Journal of Electrochemical Science, vol. 15, Aug. 2020, pp. 8190-8199.

\* cited by examiner

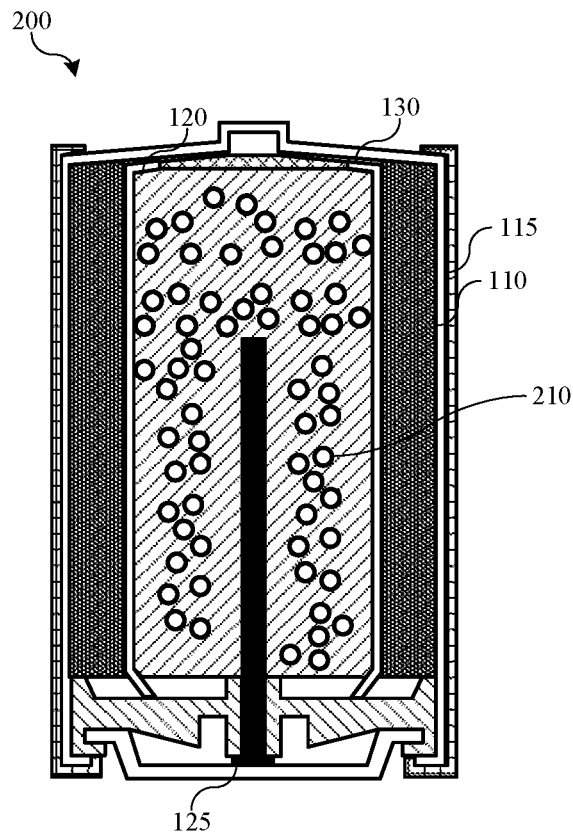
*FIG. 2*
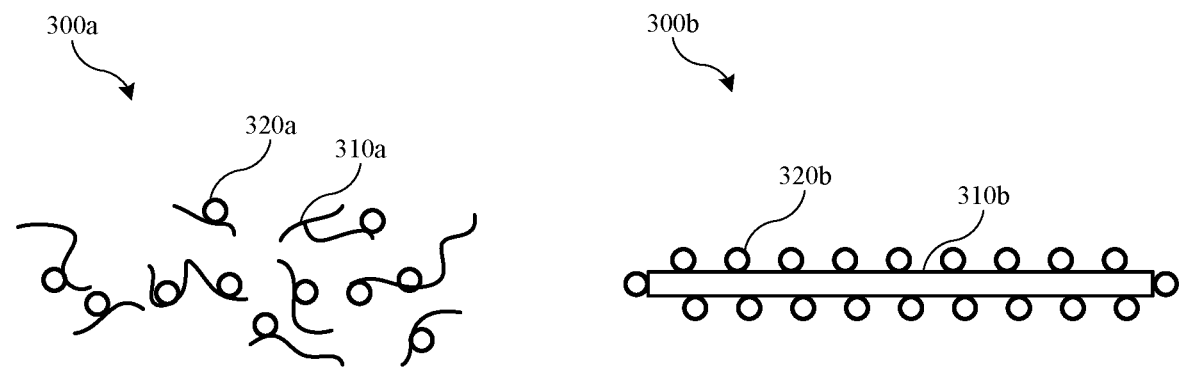
*FIG. 3A*
*FIG. 3B*

RECHARGEABLE BATTERY WITH HYDROGEN SCAVENGER

CROSS-REFERENCE TO RELATED APPLICATIONS

This application is a continuation of International Patent Application No. PCT/US2018/042598, filed Jul. 18, 2018, which claims priority to U.S. Provisional Application No. 62/536,056, filed Jul. 24, 2017, the disclosures of which are hereby incorporated by reference in their entirety for all purposes.

TECHNICAL FIELD

The present technology relates to batteries and battery components. More specifically, the present technology relates to scavenger incorporation in rechargeable battery cell designs.

BACKGROUND

In battery-powered devices, reactions occurring during operation may produce one or more gases. These gases may be vented or released in some designs, or may build up within the battery, which may impact performance. Improved designs are needed.

SUMMARY

The present technology relates to energy storage devices, including battery cells and batteries, which may include zinc alkaline batteries or lithium-ion batteries having a variety of shapes including wound cells, and stacked cells, which may be or include bipolar batteries as well as batteries stacked in any orientation including vertical and horizontal, for example. These devices may include a number of cell structures that utilize aspects of the present technology, and which can include wound, cylindrical, prismatic, and other battery configurations. The cells may include a host of features and material configurations as will be described throughout this disclosure.

Energy storage devices, battery cells, and batteries of the present technology may include a first current collector and a second current collector. The batteries may include an anode material coupled with the first current collector. The batteries may include a cathode material coupled with the second current collector. The batteries may also include a separator positioned between the cathode material and the anode material. The batteries may include a hydrogen-scavenger material incorporated within the anode active material or the cathode active material. The hydrogen scavenger material may absorb or react with hydrogen at a temperature above or about 20° C.

In some embodiments, the hydrogen scavenger material may be configured to react with hydrogen at a pressure of greater than or about 0.1 bar. The hydrogen scavenger material may be configured to react with hydrogen at a temperature above or about 40° C. The hydrogen scavenger material may be characterized by a volumetric capacity for hydrogen greater than or about 10 g/L. The anode active material may include a zinc-containing material, and the cathode active material may include a manganese-containing material, a nickel-containing material, or a silver-containing material. The hydrogen scavenger material may include a base material and a catalyst. The base material may be or include a carbon-containing material. The carbon-containing material may include an allotrope of carbon. The carbon-containing material may be or include a polymer characterized by a carbon-carbon double bond or a carbon-carbon triple bond. The catalyst may be or include a metal-containing material.

In some embodiments, the metal-containing material may include a metal selected from the group consisting of iridium, nickel, platinum, lanthanum, titanium, cerium, palladium, rhodium, or ruthenium. The hydrogen scavenger material may be configured to remain substantially inert to the electrolyte at the operating potential of the anode active material or cathode active material within which the hydrogen scavenger is incorporated. The hydrogen scavenger material may be incorporated with the cathode active material, and the hydrogen scavenger material may be configured to increase oxygen production at the cathode by less than or about 1 g/L. The hydrogen scavenger material may be incorporated with the anode active material, and the hydrogen scavenger material may be configured to increase hydrogen production at the anode by less than or about 1 g/L.

The present technology also encompasses battery cells. Exemplary battery cells may include an anode active material and a cathode active material. The battery cells may include a separator positioned between the anode active material and the cathode active material. The battery cells may also include a hydrogen scavenger material in contact with the separator. The hydrogen scavenger material may absorb or react with hydrogen at a temperature above or about 20° C.

In some embodiments, the hydrogen scavenger material may be disposed on a surface of the separator. The hydrogen scavenger material may be incorporated within the separator. The anode active material may be or include a zinc-containing material, and the cathode material may be or include a manganese-containing material, a nickel-containing material, or a silver-containing material. The hydrogen scavenger may be or include a base material and a supported catalyst.

The present technology also encompasses batteries. Exemplary batteries may include a battery casing characterized by an interior surface and an exterior surface. The batteries may include a first current collector and a second current collector. The batteries may include an anode active material coupled with the first current collector, and may include a cathode active material coupled with the second current collector. The batteries may include a separator positioned between the anode material and the cathode material. The batteries may also include a hydrogen scavenger material positioned along the interior surface of the battery casing. The hydrogen scavenger material may absorb or react with hydrogen at a temperature above or about 20° C. In some embodiments, the hydrogen scavenger materials may include a carbon-containing base material and a catalyst.

Such technology may provide numerous benefits over conventional technology. For example, the present devices may reduce hydrogen buildup within the cell without compromising cell integrity. Additionally, the designs may maintain standard form factors and capacity during operation. These and other embodiments, along with many of their advantages and features, are described in more detail in conjunction with the below description and attached figures.

RIEF DESCRIPTION OF THE DRAWINGS

A further understanding of the nature and advantages of the disclosed embodiments may be realized by reference to the remaining portions of the specification and the drawings.

FIG. 2 shows a schematic cross-sectional view of an energy storage device according to embodiments of the present technology.

FIGS. 3A-3B show schematic illustrations of hydrogen scavenger materials according to embodiments of the present technology.

Figure 1:
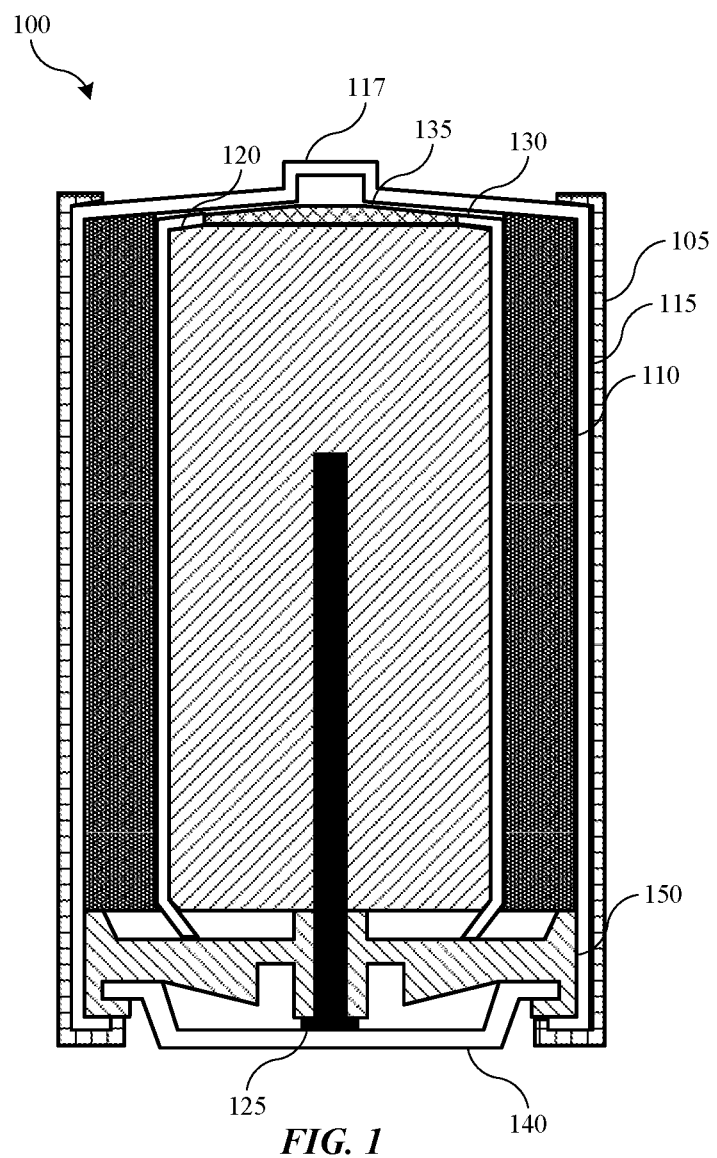
FIG. 1 shows a schematic cross-sectional view of an energy storage device according to embodiments of the present technology.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

Batteries, battery cells, and more generally energy storage devices, may be made from a host of materials. For example, alkaline batteries may include electrochemical cells in which the electrolyte may be a concentrated aqueous solution of potassium hydroxide or hydroxides of other Group I or alkali metals. Similar to other battery cell designs, the composite may include a positive electrode and negative electrode with a separator disposed between them to prevent electrical shorting, while allowing ionic transport. Because the electrolyte may be an aqueous solution, an issue in many such electrical cells is the reduction of water at the negative electrode to produce hydrogen. Electrons from the negative electrode, which may be the anode in some designs, are provided to hydrogen cations within the solution, and hydrogen gas may be produced. This hydrogen gas may build up within the cell, and may cause mechanical damage or disruptions with the electrical operation of the cell reducing capacity or cycle life of the battery in which it is disposed.

Conventional technologies have attempted to resolve this issue in a few ways. One way to address the buildup is to include vents in the cell for release of hydrogen gas. However, these vents may also allow other materials to escape the cell, and may provide a point of ingress for environmental air or contaminants. Other designs may increase the thickness of cell walls to contain the pressure buildup over time, or modify materials within the cell in an attempt to reduce or limit the hydrogen formation. These modifications do not remove the hydrogen gas, though, and will allow the battery capacity to reduce over time as the gas continues to build.

The present technology overcomes these issues by incorporating an additional material within the battery cells to scavenge produced hydrogen. This hydrogen scavenger material may reduce, limit, or essentially prevent hydrogen gas buildup within the cell, which may aid or resolve the issues discussed above. The hydrogen scavenger materials may be included in various positions within the cell to provide an area for hydrogenation of the scavenger material, which may remove the hydrogen gas from the cell by incorporating it within the scavenger material. After describing battery and cell designs utilizing the present technology, the disclosure will discuss a variety of embodiments incorporating these hydrogen scavenger materials in new cell structures.

Although the remaining portions of the description will routinely reference batteries with an alkaline electrolyte, it will be readily understood by the skilled artisan that the technology is not so limited. The present designs may be employed with any number of battery or energy storage devices, including other rechargeable and primary, or non-rechargeable, battery types, as well as electrochemical capacitors also known as supercapacitors or ultracapacitors. Moreover, the present technology may be applicable to batteries and energy storage devices used in any number of technologies that may include, without limitation, phones and mobile devices, handheld electronic devices, laptops and other computers, appliances, heavy machinery, transportation equipment including automobiles, water-faring vessels, air travel equipment, and space travel equipment, as well as any other device that may use batteries or benefit from the discussed designs. Accordingly, the disclosure and claims are not to be considered limited to any particular example discussed, but can be utilized broadly with any number of devices that may exhibit some or all of the electrical or chemical characteristics of the discussed examples.

FIG. 1 shows a schematic cross-sectional view of an energy storage device 100 according to embodiments of the present technology. FIG. 1 illustrates a cylindrical battery, which may be an alkaline battery in embodiments. It is to be understood that the battery form is exemplary, and other wound or layered batteries may include similar components including pouch or prismatic cells, which may similarly be used with the present technology. Energy storage device 100 may include an outer casing 105 that contains the components of energy storage device 100. Within outer casing 105 may be a cathode active material 110, which may be in contact with a cathode current collector 115. Cathode current collector 115 may be coupled with an additional conductive element, or may form positive terminal 117 of energy storage device 100. Cathode current collector 115 may be stainless steel, or some other conductive material suitable for electronic transmission. Energy storage device 100 may also include an anode active material 120, which may be in contact with an anode current collector 125.

Anode current collector 125 may form or be coupled with an additional conductive element forming negative terminal 140. Anode current collector 125 may be brass, or some other conductive material suitable for electronic transmission. A separator 130 may be positioned between cathode active material 110 and anode active material 120 to prevent short circuiting between the materials. A portion of separator 130 or a separate insulator 135 may be positioned connected with the separator 130 to further limit contact of the negative anode material 120 with the positive terminal 117. Additionally, an insulator 150 may be positioned between the anode current collector 125 and the cathode active material 110 and the cathode current collector 115. Insulator 150 may be composed of a flexible material to allow gas expansion within the cell during operation.

In embodiments, energy storage device 100 may be an alkaline battery or battery cell, and may include any number of materials associated with such cells. For example, anode active material 120 may include metals or metal-containing material, such as materials including poor metals including group 12, 13, 14, and 15 metals, including aluminum, cadmium, mercury, or zinc, for example. Cathode active material 110 may include materials including transition metals including manganese, nickel, or silver. For example, cathode compounds may include manganese dioxide, including alpha, beta, delta, or gamma manganese dioxide. Exemplary compounds may also include nickel hydroxide, including alpha or beta nickel hydroxide, and nickel oxide hydroxide. Exemplary compounds may also include silver hydroxide, among other metal oxides or hydroxides.

Cathode active material 110 may also include a mixture of materials including a carbon-containing material. Separator 130 may include a polymeric material such a polyolefin, including polyethylene or polypropylene. The separator 130 may also include a cellulosic material or a paper. Energy storage device 100 may include a potassium hydroxide electrolyte, which may be a concentrated aqueous solution. Although included as an electrolyte, the potassium hydroxide may not be involved in the cathode and anode reactions, which may produce balanced amounts of hydroxide. Separator 130 may allow hydroxide ions and water to diffuse across the separator 130, while limiting electrical transmission. Because of the porosity of separator 130, cations, such as zinc or manganese ions from the electrodes, may also be transported across the separator 130, which may cause one or more of the issues previously described.

Turning to FIG. 2 is shown a schematic cross-sectional view of a portion of an energy storage device 200 according to embodiments of the present technology. As illustrated, energy storage device 200 may include a battery cell, and may include multiple battery cells or batteries similar to those discussed above with regard to FIG. 1. Energy storage device 200 is shown as a battery having a single battery cell, but it is to be understood that energy storage devices encompassed by the present technology may include one or more cells up to hundreds or thousands of coupled cells in some multi-cell battery designs. Similar to FIG. 1, energy storage device 200 may illustrate a battery or battery cell, and the cell may include a first current collector 115, which may be the cathode current collector, and a second current collector 125, which may be the anode current collector. As illustrated in FIG. 2, first current collector 115 and second current collector 125 may be metal current collectors.

The cell of energy storage device 200 may also include electrode components. An anode active material 120 may be disposed on or about, or may contact second current collector 125. Similarly, a cathode active material 110 may be disposed on or contact first current collector 115. Exemplary cells may also include a separator 130 disposed or positioned between anode active material 120 and cathode active material 110. A hydrogen scavenger material 210 may be incorporated with one or both of the active materials in embodiments. Hydrogen scavenger material 210 is illustrated as incorporated within cathode active material 110, and in some embodiments hydrogen scavenger material 210 may be incorporated with anode active material 120 in addition to or as an alternative to being incorporated within cathode active material 110. Although FIG. 2 is illustrated with a cylindrical cell configuration, it is to be understood that hydrogen scavenger material 210 may be incorporated similarly with one or more of the active materials of other types of battery cells as previously described.

In battery 400, the anode active material 120 may be or include any of the materials previously described with FIG. 1, and in embodiments may include zinc or a zinc-containing material. Additionally, cathode active material 110 may be or include any of the materials previously described in FIG. 1, and in embodiments may include, for example, lead, potassium, manganese, barium, boron, or iron, as well as oxides of any of these materials. Energy storage device 200 may also include an electrolyte having alkaline characteristics including a pH of above 7. The electrolyte may include water and potassium hydroxide and may be characterized by a hydroxide ion concentration up to or about 0.5 M, up to or about 1 M, which may be equivalent to a pH of 14, up to or about 2 M, up to or about 3 M, which may be equivalent to a pH approaching 14.5, up to or about 5 M, up to or about 7 M, up to or about 10 M, which may be equivalent to a pH of 15, or higher.

The separator may be a cellulosic or polymeric material, and may be polypropylene, polyethylene, or some other polyolefin or polymer. The hydrogen scavenger material 210 may be or include a number of materials that may be configured to be reduced or saturated with hydrogen radicals within the cell. In some embodiments the hydrogen scavenger material 210 may be configured to irreversibly react with hydrogen at ambient conditions. The hydrogen scavenger material 210 may react with hydrogen in one or more ways to limit the free movement of hydrogen throughout the cell, once contacted by or interacted with the hydrogen scavenger material 210. It is to be noted that the term irreversible may encompass full irreversibility, and may also encompasses processes in which the reaction is essentially irreversible, substantially irreversible, or partially irreversible. For example, in some embodiments, certain hydrogen ions or molecules may be re-formed after reaction with the hydrogen scavenger material 210, although a majority of hydrogen ions scavenged may not.

The hydrogen scavenger material 210 may be configured to interact with hydrogen gas or hydrogen molecules at a variety of temperatures, such as at temperatures greater than or about 10° C. The hydrogen scavenger material 210 may also be configured to interact with hydrogen gas or hydrogen molecules at temperatures greater than or about 20° C., greater than or about 30° C., greater than or about 40° C., greater than or about 50° C., greater than or about 60° C., greater than or about 70° C., greater than or about 80° C., or higher. The hydrogen scavenger material 210 may also be configured to interact with hydrogen at temperatures less than or about 100° C., less than or about 90° C., less than or about 80° C., less than or about 70° C., less than or about 60° C., less than or about 50° C., less than or about 40° C., less than or about 30° C., less than or about 25° C., or less, or within any smaller range encompassed within any of these stated ranges, as well as any other ranges between any stated or unstated temperatures within these ranges, such as between about 20° C. and about 60° C., for example.

The temperature at which the hydrogen scavenger material 210 reacts with the hydrogen within the cell may be tuned to be within a particular temperature range in embodiments to more effectively manage energy use within the cells. This may be performed by selecting and modifying materials to interact or react above certain temperatures based on material properties, for example. Because certain materials utilized for the hydrogen scavenger may not be perfectly stable at all temperatures, or within the cell environment, a certain amount of interaction between the hydrogen scavenger material and the cell components or environment may occur during periods in which the hydrogen scavenger material is active. Accordingly, when materials that are more stable at lower operating temperatures are used, the hydrogen scavenger material may be configured to react at temperatures greater than or about 20° C. This may allow the hydrogen scavenger to operate more frequently, which may maintain the cell internal pressure from accumulated hydrogen relatively low at most times.

Additionally, when materials that are more stable at higher operating temperatures are used, the hydrogen scavenger material may be configured to react at temperatures greater than or about 40° C. Because certain of the embodiments may include one or more electrochemical reactions or interactions, by utilizing materials that activate at higher temperatures, the cell may be operated to scavenge hydrogen during charging cycles, and to remain in an inert or unreactive state during normal operation, or discharge. This may facilitate minimizing the hydrogen scavenging process from consuming battery capacity.

Pressure may also be utilized as a mechanism by which hydrogen scavenging may be performed. For example, pressure within the battery or within each cell may be monitored by the battery management system, for example. When the pressure reaches a predetermined threshold, such as from hydrogen buildup, the hydrogen scavenging material may be activated to remove the hydrogen. This may limit the reactive use of the hydrogen scavenging material to fewer periods of time, to limit interaction with other battery components. The hydrogen scavenger material may be configured to activate when the pressure within the cell is determined to be greater than or about 0.01 bar, greater than or about 0.02 bar, greater than or about 0.05 bar, greater than or about 0.08 bar, greater than or about 0.1 bar, greater than or about 0.2 bar, greater than or about 0.3 bar, greater than or about 0.4 bar, greater than or about 0.5 bar, greater than or about 0.6 bar, greater than or about 0.7 bar, greater than or about 0.8 bar, greater than or about 0.9 bar, greater than or about 1 bar, greater than or about 2 bar, greater than or about 3 bar, greater than or about 4 bar, greater than or about 5 bar, greater than or about 6 bar, greater than or about 7 bar, greater than or about 8 bar, greater than or about 9 bar, greater than or about 10 bar, or higher.

Depending on the amount of hydrogen predicted to be produced by the cell, the size of the cell, the amount of hydrogen scavenging material, or the materials used for the hydrogen scavenging material, the hydrogen scavenging material may be characterized by a volumetric capacity for hydrogen that is greater than or about 1 g/L. In some embodiments, the material may be characterized by a capacity for hydrogen greater than or about 2 g/L, greater than or about 4 g/L, greater than or about 6 g/L, greater than or about 8 g/L, greater than or about 10 g/L, greater than or about 15 g/L, greater than or about 20 g/L, greater than or about 25 g/L, greater than or about 30 g/L, greater than or about 35 g/L, greater than or about 40 g/L, greater than or about 45 g/L, greater than or about 50 g/L, greater than or about 55 g/L, greater than or about 60 g/L, greater than or about 65 g/L, greater than or about 70 g/L, greater than or about 75 g/L, greater than or about 80 g/L, greater than or about 85 g/L, greater than or about 90 g/L, greater than or about 95 g/L, greater than or about 100 g/L, or greater.

Because the hydrogen scavenger material may be at least partially reactive with materials within a battery cell, materials for the hydrogen scavenger material may be selected to reduce or limit reactivity with components in which it is in contact. For example, the hydrogen scavenger material may be incorporated within the anode active material in embodiments. The hydrogen scavenger material may be configured to limit reactivity with the anode materials or with materials within the cell when the hydrogen scavenger material is at anode operating potential. For example, depending on the pH within the cell, exemplary anode materials may be operating at a potential of between about 0 V and about −1 V. The hydrogen scavenger material may be configured to remain substantially inert to the electrolyte within this potential range. Additionally, the hydrogen scavenger material may be configured to increase hydrogen production at the anode by less than or about 5 g/L during any particular time period or over the life of the battery, and may be configured to increase hydrogen production at the anode by less than or about 3 g/L, less than or about 1 g/L, less than or about 0.5 g/L, less than or about 0.1 g/L, less than or about 0.05 g/L, less than or about 0.01 g/L, less than or about 0.005 g/L, less than or about 0.001 g/L, or less.

Additionally, the hydrogen scavenger material may be incorporated within the cathode active material in embodiments. The hydrogen scavenger material may be configured to limit reactivity with the cathode materials or with materials within the cell when the hydrogen scavenger material is at cathode operating potential. For example, depending on the pH within the cell, exemplary cathode materials may be operating at a potential of between about 0.5 V and about 1.5 V. The hydrogen scavenger material may be configured to remain substantially inert to the electrolyte within this potential range. Additionally, the hydrogen scavenger material may be configured to increase oxygen production at the cathode by less than or about 5 g/L during any particular time period or over the life of the battery, and may be configured to increase oxygen production at the cathode by less than or about 3 g/L, less than or about 1 g/L, less than or about 0.5 g/L, less than or about 0.1 g/L, less than or about 0.05 g/L, less than or about 0.01 g/L, less than or about 0.005 g/L, less than or about 0.001 g/L, or less.

The hydrogen scavenger material may include a number of components, and in some embodiments, the hydrogen scavenger material may include at least two materials. For example, the hydrogen scavenger material may include a base material and a catalyst to promote hydrogenation. The base material may include a polymer, a carbon-containing material, or any other material that may be capable of accepting hydrogen within its structure, or may be capable of producing a modified structure by reacting with hydrogen in one or more ways. The catalyst material may include one or more metals or materials that may adsorb hydrogen and the base material or interact with the materials to facilitate hydrogenation of the base materials. For example, the catalyst may interact with the base materials, such as by adsorption or chemical reaction such as chemisorption, and may form metal hydrides or otherwise accept hydrogen onto the surface of the catalyst as well. The hydrogen may then be transferred to the base materials or the two may react.

In some embodiments, the catalyst may be a homogenous catalyst or a heterogeneous catalyst. Example heterogeneous catalysts may be or include metal-containing materials in contact or in communication with the base materials. For example, particles including microparticles and nanoparticles of metal-containing materials may be included with base materials within one or both of the active materials within the cell. The catalyst materials may include transition metals, along with other metals or metal-containing materials. Exemplary metals for use in catalysts according to the present technology include iron, cobalt, nickel, ruthenium, rhodium, palladium, osmium, iridium, platinum, lanthanum, titanium, vanadium, and other transition metals. The catalyst materials may also include metal-containing materials including any of the noted metals, and may include a combination of any of these metals alone or with other materials. Combinations may include nickel alloys with one or more lanthanide metals including lanthanum, cerium, praseodymium, neodymium, promethium, and samarium, which may be in combination in a various forms of mischmetal or mischmetal alloys, such as alloys with nickel. Other materials in combination may be from the nitrogen group or Group 15 of the periodic table, the oxygen group or Group 16 of the periodic table, or the halogen group or Group 17 of the periodic table, as well as other hydrocarbons or materials used in catalytic materials for hydrogenation or other catalyst-based reactions. Additional materials may be any compound or material known to absorb hydrogen.

The base material may include any material capable of accepting hydrogen into the structure, which can include containing the hydrogen or trapping the hydrogen, as well as reduction of the material to react with and incorporate hydrogen within the structure. For example, in some embodiments, the base material may be or include a carbon-containing material, which may include polymers or allotropes of carbon. For example, any allotrope of carbon may be used as a scaffold for catalyst material, such as graphene including doped graphene, graphite, or other carbon allotropes. Activated carbon may be utilized, which may have been activated to increase reactivity with hydrogen, for example. Hydrocarbons and polymers including carbon may be used in embodiments, and the materials may include structures including one or more carbon-carbon double bonds or carbon-carbon triple bonds.

In some embodiments, the hydrogen may be transferred from the catalyst by reducing the number of double or triple bonds within the base material. The materials may include alkenes, alkynes, aldehydes, esters, amides, ketones, nitriles, aromatic materials or any material including at least one carbon double or triple bond, nitrogen double or triple bond, or any bonding arrangement capable of accepting one or more hydrogens within the structure. Some of the base materials used may be conductive in embodiments, and may be utilized as conductive additives as well as hydrogen scavenging materials. For example, cathode active materials may include one or more conductive additives, and in embodiments, by utilizing conductive hydrogen scavenging materials within the cathode active materials, the amounts or types of incorporated conductive additives may be reduced.

The base materials and catalyst materials may take any number of forms based on the ways in which the materials are incorporated. Turning to FIGS. 3A-3B are shown schematic illustrations of hydrogen scavenger materials 300 according to embodiments of the present technology. The hydrogen scavenger materials 300 may include any of the materials, components, or characteristics as previously discussed. As illustrated in the figures, the hydrogen scavenger material 300 may include a base material 310 and a catalyst material 320. The materials utilized may be or include any of the materials previously described.

As shown in FIG. 3A, the hydrogen scavenger material 300a may include a base material 310a and a catalyst material 320a. The materials may be generally associated with one another, bonded together in some way, or otherwise coupled. The hydrogen scavenger material may be mixed within the active material of either electrode, or may be coated on one or more surfaces of the electrode active material. As shown in FIG. 3B, hydrogen scavenger 300b may include a base material 310b and a catalyst material 320b. The base material 310b may be characterized by a specific structure, while base material 310a may not. For example, base material 310a may be an amount of a hydrocarbon-containing material, and base material 310b may be sheets or flakes of graphene. Base material 310b may have an amount of catalyst material 320b contacting or interacting with the base material. For example, catalyst may be relatively equally distributed about base material 310b as illustrated, or the two may be more randomly coupled. The catalyst may be supported by the base material 310 and adsorption between the materials may occur. In operation, when hydrogen released within the cell interacts with the hydrogen scavenger materials, the hydrogen may adsorb on the surface of the catalyst materials, and then be transferred to the base material in any of the ways previously described.

Figure 4A:
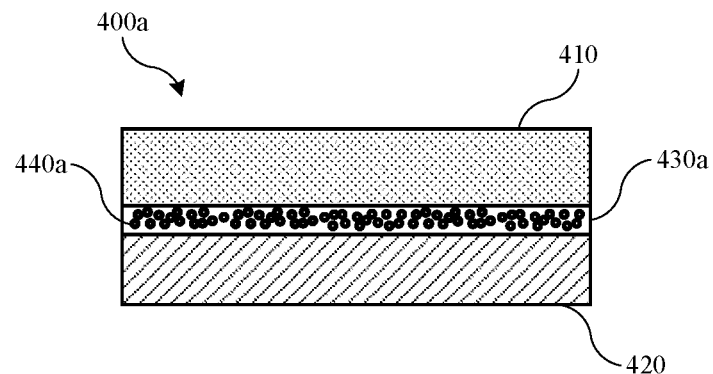
FIGS. 4A-4B show schematic cross-sectional views of components of an energy storage device according to embodiments of the present technology.
Figure 4B:
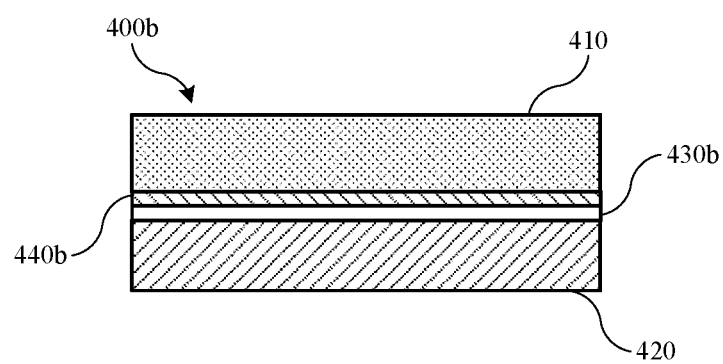

The hydrogen scavenger materials of the present technology may also be incorporated with other components of batteries according to the present technology, as will be discussed with regard to the remaining figures. FIGS. 4A-4B show schematic cross-sectional views of components of an energy storage device 400 according to embodiments of the present technology. The energy storage device may be or include a battery cell, which may be incorporated in any of the previously described batteries or cell structures, and may include any of the components, materials, or properties previously discussed. Battery cell 400 may illustrate an exemplary cathode active material 410 and an exemplary anode active material 420. Positioned between and electrically separating the two active materials may be a separator 430. Separator 430 may be a conventional separator including a polymeric, cellulosic, or paper separator. Although current collectors are not described, any of the previously described current collectors may be utilized with battery cell 400.

Energy storage device 400 may also include a hydrogen scavenger material 440, which may be included in association with the separator 430. Hydrogen scavenger material 440 may be or include any of the materials, components, or characteristics previously described, and may include a base material and a supported catalyst in embodiments. As illustrated in the figures, hydrogen scavenger material 440 may be included in contact with the separator in one or more ways. FIG. 4A illustrates an embodiment where hydrogen scavenger material 440a is incorporated within the separator 430a. In embodiments, the separator 430a may be or include one or more polymeric materials that may include any of the polymeric materials or other base materials described above. In some embodiments, any of the separators may be or include a blend of polymeric materials or other noted materials including any of the separator materials and base materials previously described. The separator may then also support a catalyst material within the structure.

FIG. 4B illustrates an embodiment that may be used in addition to or as an alternative to the configuration of FIG. 4A or any of the previous figures. As shown, the hydrogen scavenger material 440b may be incorporated as a layer disposed on or with the separator 430b. The layer of hydrogen scavenger material 440b may be included on either or both sides of the separator 430b, and may be in contact with either or both of the electrode active materials as well. In these examples, when hydrogen travels through the cell and contacts the separator, the hydrogen may be incorporated within the separator or any of the base materials included within the separator.

Figure 5A:
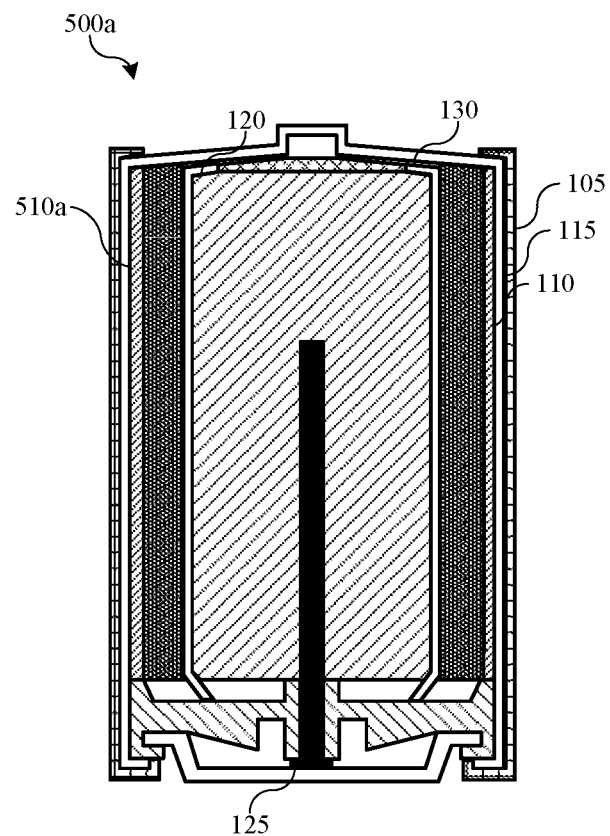
FIGS. 5A-5B show schematic cross-sectional views of an energy storage device according to embodiments of the present technology.
Figure 5B:
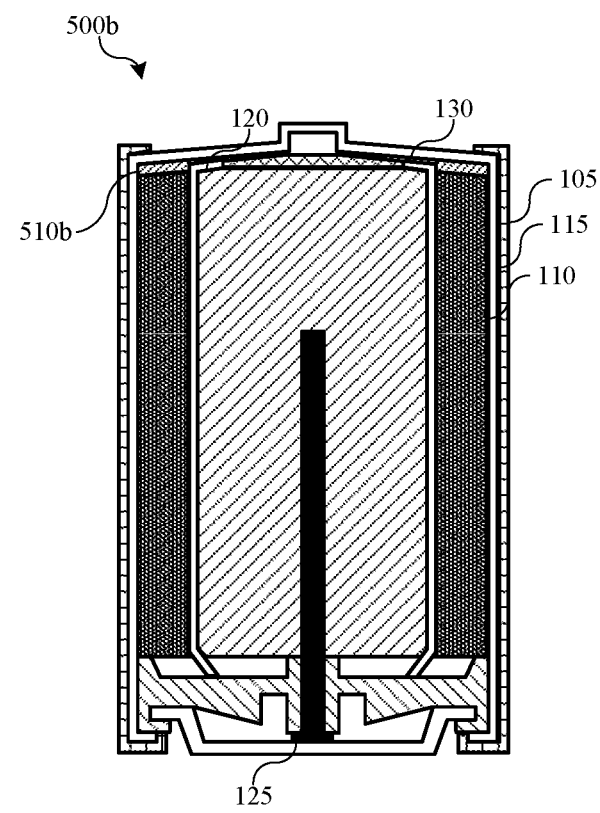

FIGS. 5A-5B show schematic cross-sectional views of an energy storage device 500 according to embodiments of the present technology. As illustrated, energy storage device 500 may include a battery, and may include multiple battery cells or batteries similar to those discussed above with regard to any of the previous figures. Energy storage device 500 is shown as a battery having a single battery cell, but it is to be understood that energy storage devices encompassed by the present technology may include one or more cells up to hundreds or thousands of coupled cells in some multi-cell battery designs. Similar to FIGS. 1 and 2, energy storage device 500 may illustrate a battery or battery cell, and the cell may include a first current collector 115, which may be the cathode current collector, and a second current collector 125, which may be the anode current collector. As illustrated in FIG. 5, first current collector 115 and second current collector 125 may be metal current collectors.

The cell of energy storage device 500 may also include electrode components. An anode active material 120 may be disposed on or about, or may contact second current collector 125. Similarly, a cathode active material 110 may be disposed on or contact first current collector 115. Exemplary cells may also include a separator 130 disposed or positioned between anode active material 120 and cathode active material 110. A hydrogen scavenger material 510 may also be incorporated within the battery. Hydrogen scavenger material 510 may be associated with or coupled with the current collector 115 or an interior surface of battery casing 105 previously described. As illustrated in the figures, hydrogen scavenger material 510 may be included in one or more locations within the cell.

FIG. 5A shows battery 500a including hydrogen scavenger material 510a positioned along an interior surface of current collector 115. Hydrogen scavenger material 510a may be positioned along an entire length of the current collector in which active material is disposed, or may be included in discrete locations. Hydrogen scavenger material 510a may be characterized by any of the materials and characteristics previously described, and in embodiments may include a base material and a catalyst material. When included along the outer current collector, a conductive base material may be used in some embodiments, although in other embodiments any of the previously described materials may be used.

FIG. 5B shows battery 500b including hydrogen scavenger material 510b positioned along an interior surface of what may be battery casing 105 or a portion or current collector 115 on which active material may not be disposed, and which may act as a portion of the battery casing. FIG. 5B shows just one location where hydrogen scavenger material 510b may be located, and it is to be understood that hydrogen scavenger material 510b may be included in any location about the cell where it may interact with hydrogen produced within the cell. Depending on the location, a more insulative hydrogen scavenger material 510b may be utilized in some embodiments. For example, in locations where additional insulation may be included, the insulation may be replaced with or complimented by hydrogen scavenger material 510b. In other embodiments, the hydrogen scavenger material may include any of the materials previously described. By utilizing hydrogen scavenger materials according to the present technology, cycle life of batteries may be improved by utilizing materials that reduce hydrogen buildup within the cell.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:

1. A battery comprising:
a first current collector;
an anode active material coupled with the first current collector;
a second current collector;
a cathode active material coupled with the second current collector; and
a separator positioned between the anode active material and the cathode active material;
a hydrogen scavenger material incorporated with the anode active material, wherein the hydrogen scavenger material absorbs hydrogen at a temperature above or about 40° C., wherein the hydrogen scavenger material comprises a base material including a carbon-containing material, wherein the carbon-containing material comprises an allotrope of carbon, and wherein the hydrogen scavenger material comprises a catalyst disposed on or within the base material.

2. The battery of claim 1, wherein the hydrogen scavenger material is configured to react with hydrogen at a pressure of greater than or about 0.1 bar.

3. The battery of claim 1, wherein the hydrogen scavenger material is characterized by a volumetric capacity for hydrogen greater than or about 10 g/L.

4. The battery of claim 1, wherein the anode active material comprises a zinc-containing material, and wherein the cathode active material comprises a manganese-containing material, a nickel-containing material, or a silver-containing material.

5. The battery of claim 1, wherein the catalyst comprises a metal-containing material, and wherein the metal-containing material includes a metal selected from the group consisting of iridium, nickel, platinum, lanthanum, titanium, cerium, palladium, rhodium, and ruthenium.

6. The battery of claim 1, wherein the hydrogen scavenger material is configured to remain substantially inert to an electrolyte at an operating potential of the anode active material within which the hydrogen scavenger is incorporated.

7. The battery of claim 1, wherein the hydrogen scavenger material is configured to increase hydrogen production at the anode by less than or about 1 g/L.

8. The battery of claim 1, wherein the carbon-containing material comprises sheets or flakes of graphene.

9. The battery of claim 1, wherein the catalyst is equally distributed about the carbon-containing material.

10. The battery of claim 1, wherein the hydrogen scavenger material is coated on one or more surfaces of the anode active material.

\* \* \* \* \*